June 19, 1951  H. L. WILLIAMS  2,557,163

WATER TIGHT SLIDE FASTENER

Filed Feb. 1, 1946  4 Sheets-Sheet 1

INVENTOR.
Harvey L. Williams
BY
Blair Curtis & Hayward
ATTORNEYS

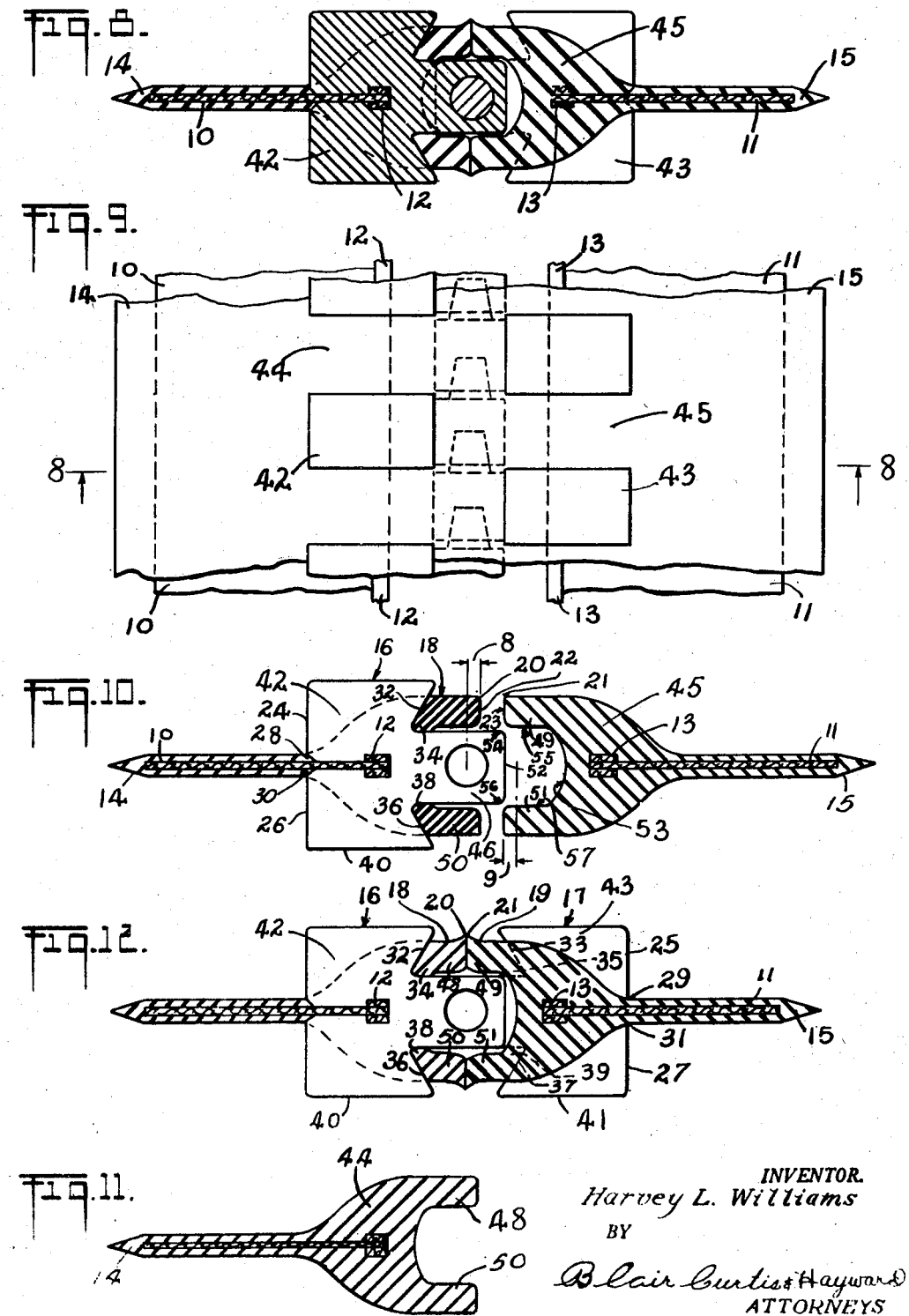

June 19, 1951        H. L. WILLIAMS        2,557,163
WATER TIGHT SLIDE FASTENER
Filed Feb. 1, 1946        4 Sheets-Sheet 3
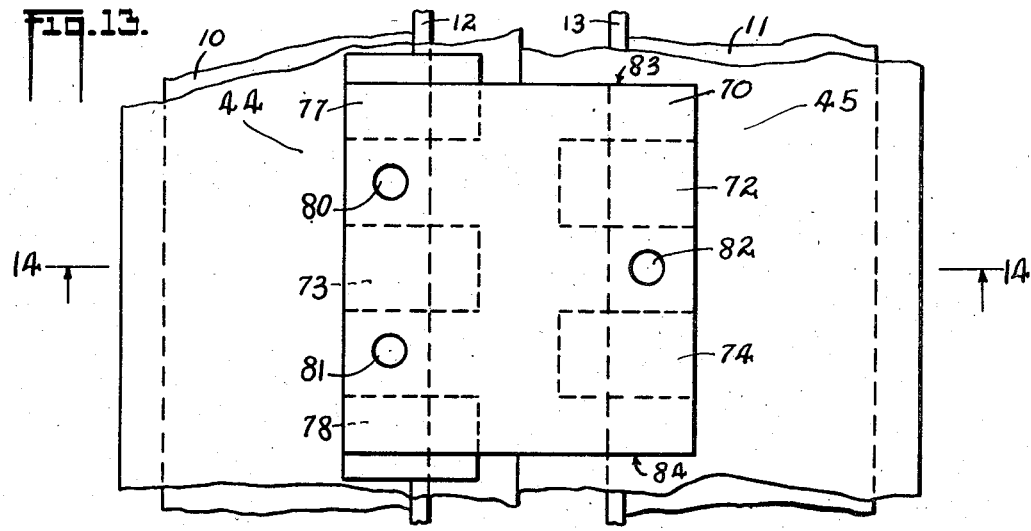
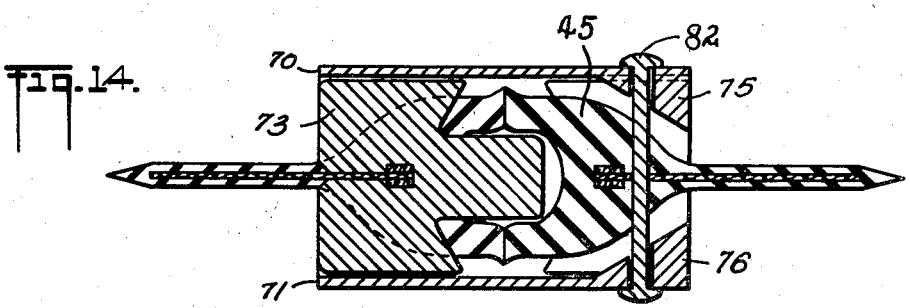
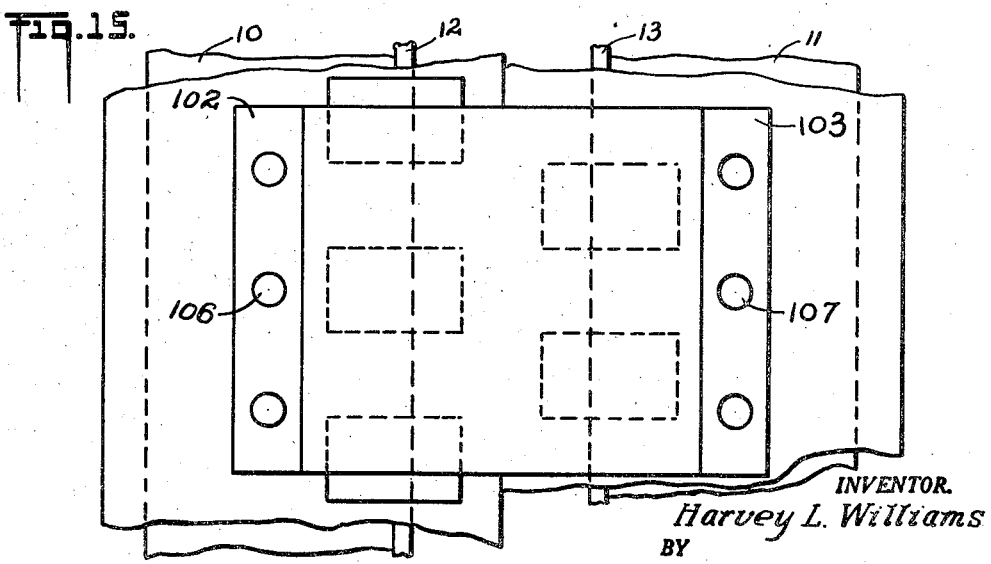
INVENTOR.
Harvey L. Williams
BY
Blair Curtis Hayward
ATTORNEYS June 19, 1951 H. L. WILLIAMS 2,557,163
WATER TIGHT SLIDE FASTENER
Filed Feb. 1, 1946 4 Sheets-Sheet 4
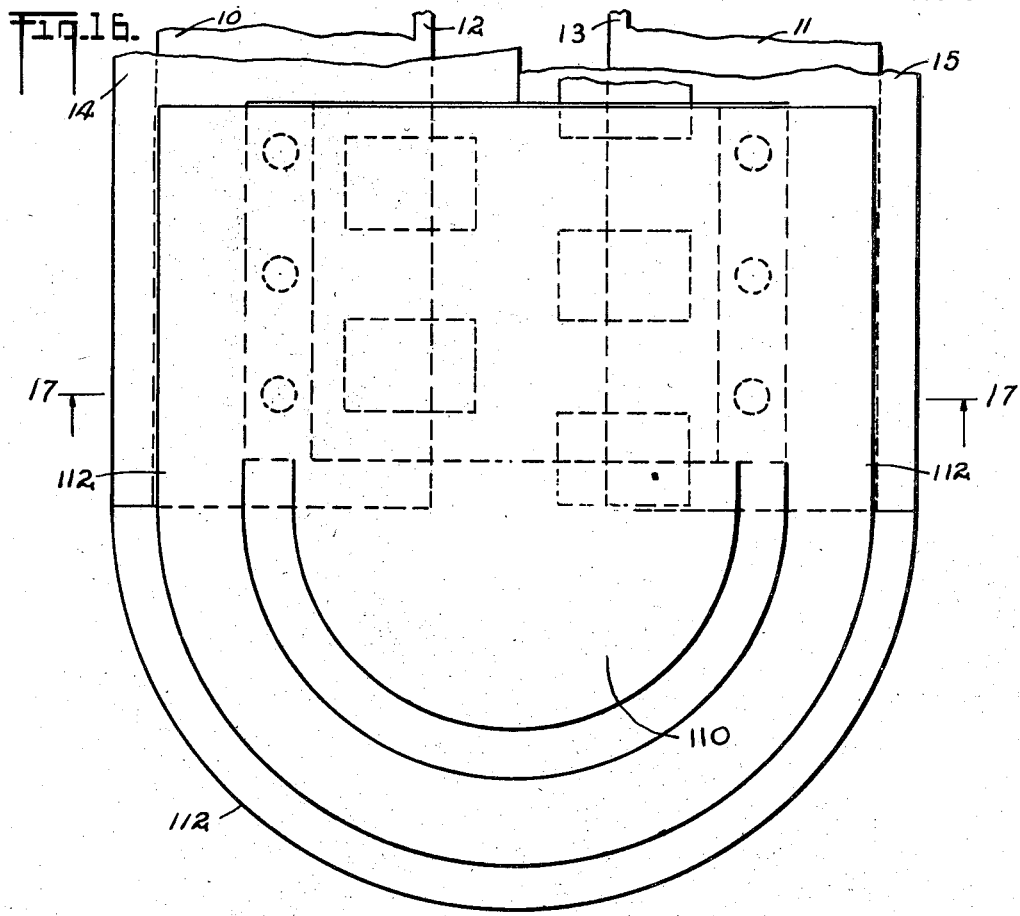
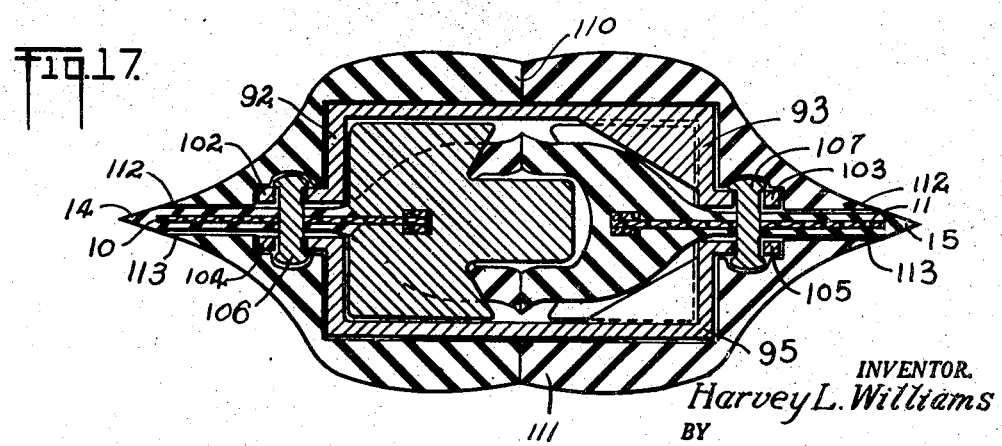
INVENTOR.
Harvey L. Williams
BY
Blair Curtis & Hayward
ATTORNEYS Patented June 19, 1951

2,557,163

UNITED STATES PATENT OFFICE 2,557,163

WATERTIGHT SLIDE FASTENER

Harvey L. Williams, Hadlyme, Conn.

Application February 1, 1946, Serial No. 644,699

8 Claims. (Cl. 24—205.1)

My invention described herein relates to methods of making the conventional zipper or slide fastener water tight, by adding components of rubber, the various synthetic plastics or other resilient waterproof materials and by securing them to the slide fastener chains.

In conventional slide fasteners, chains of teeth are brought together along converging lines so that, as they meet, the teeth on opposite chains alternate, the teeth on one chain being received, respectively, between adjacent teeth on the opposite chain. The faces thus engaged by the adjacent teeth of the opposite chain are found to inter-fit in such manner that, when the chains are closed together the teeth are locked to one another and cannot be pulled apart, each until the next tooth in the chain has been released. Ordinarily, these chains are made by forming the teeth of metal or hard plastic and securing them into a flexible strip which is of substantially fixed length, i. e., does not stretch under any expected tension sufficiently to release the teeth from their inter-locked condition—but it is also possible to make such fasteners without the usual tape using chain links or other flexible or articulated connection between the teeth.

Since it is highly desirable to use such fasteners on overshoes, waterproof clothing, tents, storm cover for various apparatus, etc., it has been recognized as a serious shortcoming of such fasteners that they have small openings between the interdigitating teeth; and various attempts have been made to remedy this by providing a waterproof strip or strips which come over the fastener when it is closed. Such strips when placed under the slider create excessive friction interfering with its smooth operation and often being punctured when caught between teeth of the chain and the slider. When, as an alternative, the waterproof sealing strips are arranged over the slider it necessitates a free extension from well beyond the line of teeth and a relatively high flexibility to permit the slider to pass under them in closing and opening of the fastener. These have been regarded as inescapable limitations inherent in the principle of the slide fastener; and it has been recognized that they result in failure under various conditions of flexure pressure, impact, flow, etc.

It is an object of my invention to overcome these limitations and to provide a sealable closure which is able to meet satisfactorily the various conditions of service which it may be expected to encounter.

More particularly it is an object of my invention to so seal the fastener chains when closed, that water will not leak through even when the chain is subjected to considerable distortion and under various conditions of impact or pressure or flow.

Another object of my invention is to provide such a sealable fastener which can be made by usual processes which involve the forming of the teeth or "scoops" before they are secured to the beaded edge of the stringer. Such teeth or scoops may be manufactured on conventional machinery used in the industry for this purpose. In the case of teeth or scoops which are molded or cast directly to the beaded edge of the tape, the desired tooth form may be obtained by a simple manufacturing process.

Another objective of my invention is to provide a means of rendering a conventional zipper or slide fastener watertight with the minimum weight of rubber, plastic or other resilient material being added to the slide fastener for that purpose. In this connection reference is particularly made to that part of the rubber, plastic, or other resilient material which forms the actual seal between the two sides or stringers of the complete slide fastener.

Another objective of my invention is to provide a means of rendering a zipper or conventional slide fastener watertight in such a manner that the slide fastener may still close or inter-mesh the teeth or scoops on one of the inter-digitating chains with those on the other chain in the usual fashion by camming pressure against the outer or "heel" ends of such teeth or scoops; the inner surfaces of the top and bottom planes and side flanges attached thereto of a conventional slider riding over metal surfaces formed by the top and bottom and ends of the scoops or teeth; the scoops or teeth on one stringer being separated from those on the other stringer by the action of the frog connecting the top and bottom planes of the slider acting upon the noses of the scoops or teeth, or in a more advantageous manner made possible by the present invention, all of these actions being secured without the waterproofing components coming in contact with the outer surfaces of the slider and without the waterproofing elements bearing upon the inner surfaces of the slider. This is accomplished by designing the rubber, plastic, or components of other suitable resilient material in such fashion that in cross sections the outer dimensions of both the individual scoop or tooth and opposing parts of scoops or teeth are larger than the cross sections of the waterproofing component itself, i. e., so that heel portions of the teeth project above the waterproof layer or integument.

The unusual features of this invention are best shown by the following drawings in which certain embodiments of the invention are disclosed and in which the separate parts are designated with suitable references, as follows:

Figure 8 is a sectional view taken on line 8—8 of Figure 9.

Figure 9 is a plan view of sealed and interlocked fastener chains embodying the invention.

Figure 10 is a view in cross section showing two chains approaching and facing one another but not interlocked.

Figure 11 is a section taken behind the tooth shown in Figure 10, thus showing the identity of the two chains.

Figure 12 is a view in cross section showing the chains of Figure 10 when interlocked together.

Figure 13 is a plan view of interlocked chains similar to Figure 9 but showing the end stop plate.

Figure 14 is a sectional view taken on line 14—14 of Figure 13.

Figure 15 is a view similar to Figure 13 but showing a modified end stop plate.

Figure 16 is a plan view of the end of a fastener embodying the invention.

Figure 17 is a sectional view taken on line 17—17 of Figure 16.

At the outset of the description of my invention reference is made to Figures 1-4. In the first two figures are shown two types of conventional scoops or teeth widely used on slide fasteners. One is of the type which is formed with a recess on one side of the nose of the tooth, and a projection on the other side of the nose. The second is the type of tooth which is symmetrical around a plane perpendicular to the longitudinal axis of the slide fastener. In both types of teeth, and in all other types presently used in the slide fastener industry, the dimension A, indicating the thickness of the tooth at its outer or heel end, is substantially the same as dimension B, indicating the thickness at the nose end.

Figure 1:
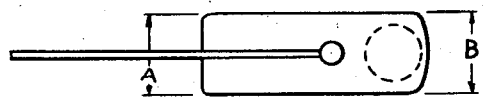
Figures 1 and 2 are cross sectional views taken through two commercial types, respectively, of slide fastener chains.
Figure 2:
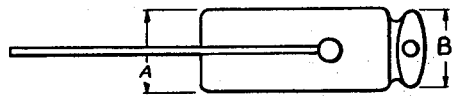
Figure 3:
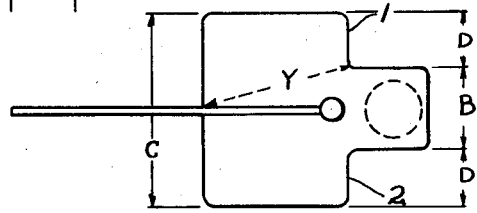
Figures 3 and 4 are views corresponding respectively to Figures 1 and 2 but showing modifications of the teeth to embody my invention.
Figure 4:
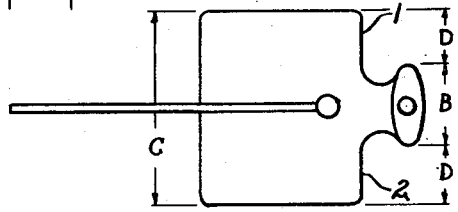

To accomplish one of the objectives in my invention the thickness of the tooth has been increased from the heel end towards the nose end as indicated by the next two diagrams in Figures 3 and 4. In these diagrams the dimension B remains the same as it was for conventional slide fasteners. However, the thickness at the heel end of the tooth has been increased to dimension C which is the sum of dimension D plus dimension B plus dimension D. It will be noted that dimension D is the amount by which the thickness of the scoop has been increased on each side of its center line (or on each side of the tape), thereby creating the shoulders on the opposite sides of the tooth designated by 1 and 2. Such shoulders 1 and 2 may be created on any tooth regardless of the shape of the nose and regardless of the method of interlocking or intermeshing the noses.

Figure 5:
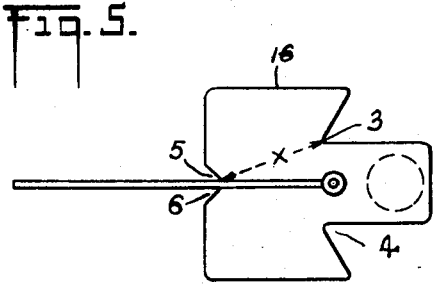
Figure 5 is a sectional view similar to Figure 3, but showing a further modification embodying an improvement according to the present invention.
Figure 6:
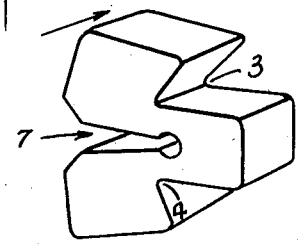
Figure 6 is a perspective view of one of the teeth of Figure 5 before application to the tensile strip.

In Figures 5 and 6 is shown the further development of a tooth to enable the waterproofing component more securely to engage the teeth. It will be noted that in shoulder 1 the groove 3 has been formed. In shoulder 2 the groove 4 has been formed. In the outer end of the tooth the grooves 5 and 6 have been formed adjacent to the tape.

One usual method of manufacturing teeth used on slide fasteners is to cut these from a preformed wire. When this method is used the wire has the cross section which is identical with the shape of the finished scoop as it would be shown in a side elevation such as Figure 1 or 2, except for the fact that the slit 7 into which the tape is placed is spread open for reception of the tape or other tensile member. Thereafter the two outer ends of the heel of each scoop or tooth are pressed together bringing their edges at slit 7 into engagement with the tape.

It is obvious that my invention may be applied to slide fasteners, the teeth of which are formed by this process merely by preforming the wire from which the scoops are cut to a shape approximating that shown in Figures 3, 4, or 5 (but spread open as indicated in Figure 6).

Another usual method of manufacturing the teeth used on conventional slide fasteners is to stamp these from a strip of metal. In such a process the teeth are stamped with the slit 7 open so that the tape may be inserted, the two outer ends of the teeth being subsequently pressed towards each other to securely grasp the tape and to bring the edges of slit 7 into parallel with each other and into firm contact with the tape throughout their length. It is obvious in this method of manufacture my invention may be applied by using a cutting die of the appropriate shape.

In the case of teeth which are molded or cast directly to the tape it is usual for the molds or dies to open and to close in a direction which is perpendicular to the plane of the tape. With the forms shown in Figures 3 and 4, the method is obviously applicable merely by designing the dies to the shape shown. In Figures 5–16, however, grooves 3, 4, 5, 6, etc., would represent undercuts which it would be impossible to make. However, these grooves may be formed by cores, or by passing the tape with the scoops attached after molding or casting thereon through a machine which would cut these grooves in the respective surfaces of each tooth in a continuous process.

In Figures 10–12, as in the other drawings accompanying this invention, 10 and 11 are the tapes in the left and right hand chains of slide fasteners. 12 and 13 are beads on the tapes of the left and right hand chains respectively. 14 and 15 represent coatings of rubber, plastic or other suitable material on the upper and lower surfaces of tapes 10 and 11 which have been brought out to a feather edge.

Tooth 42 is attached to tape 10 and engages its bead 12. Similarly tooth 43 is attached to tape 11 and bead 13. These teeth may be attached to their respective tapes and beads by any of the conventional processes of the slide fastener manufacture.

Formed or cut into teeth 42 are grooves 28 and 30 in the outer end surface adjacent to the intersection of that surface with tape 10. Grooves 28 and 30 may be of any shape, size or location in the outer surface of tooth 42 which will enable them to engage the rubber, plastic or other suitable materials of which the coating 14 and the elements 44 are made.

In teeth 42 are formed, molded, cast or cut shoulders 32 and 36 and grooves 34 and 38. These shoulders and grooves run across the faces of teeth 42 which are parallel to the longitudinal axis of the slide fastener and which are above and below the nose portion of the teeth 46. The size and shape of shoulders 32 and 36 and the size, shape and location of grooves 34 and 38 are immaterial providing shoulder 32 in combination with groove 34 and shoulder 36 in combination with groove 38 provide a cross section which will engage lips 48 and 50 respectively of components 44 so that said lips are retained to the teeth 42 and in a position with respect to nose section 46 with no more movement outward away from the plane of tape 10 than is desired. If the resilient material adheres to the teeth, the undercut grooves are not necessary; and even without this a form such as that of Figures 3 and 4 will ordinarily be satisfactory.

Similarly the teeth 43 formed with shoulders 33 and 37 cooperating with grooves 35 and 39 and with grooves 29 and 31 in the same fashion and for the same purpose as applied to the respective elements or components of tooth 42.

A water tight and air tight seal is accomplished in such a slide fastener by the pressure of the waterproofing integument 44 against waterproof integument 45. In more detail this action may be described as follows:

Waterproofing integument 44 is continuous along tape 10 between the outer edge of the complete watertight slide fasteners and outer surfaces 24 of tooth 42. Waterproofing integument 44 is also continuous along the length of the slide fastener in the area between the outer edge of the completed watertight slide fastener and the outer surface 26 of tooth 42.

Waterproofing integument 44 is also continuous along the length of the slide fastener between the surface of shoulder 32 of tooth 42 and corner 20 of lip 48. In fact lip 48 and lip 50 are continuous throughout the length of the slide fastener. That portion represented by the section between the surface 32 and outer surface 34 of scoop 42, and that section represented by shoulders 36 and 42, waterproofing integument 24 is intermeshed with other teeth above and below its top and lower surfaces.

The condition described may be seen in Figure 9 where surface 16 of tooth 42 and surface 17 of tooth 42 and corresponding surfaces of other teeth are visible above the surface of waterproofing integuments 44 and 45. This construction is also evident in Figure 7.

It will be noted that the outer surface 22 of lip 48 has been extended beyond a sealing contact line, which as shown is the pitch line of the teeth by the amount indicated by the dimension 8. Similarly the outer surface of lip 50 has been extended beyond pitch line P. Similarly outer surface 23 of lip 49 and outer surface of lip 51 are extended beyond the pitch line by the amount indicated by dimension 9. The result of this extension of the outer surface of abutting lips 48 and 49 and abutting lips 50 and 51 is that a compression is secured along the pitch line when the slide fastener is closed.

Figure 7:
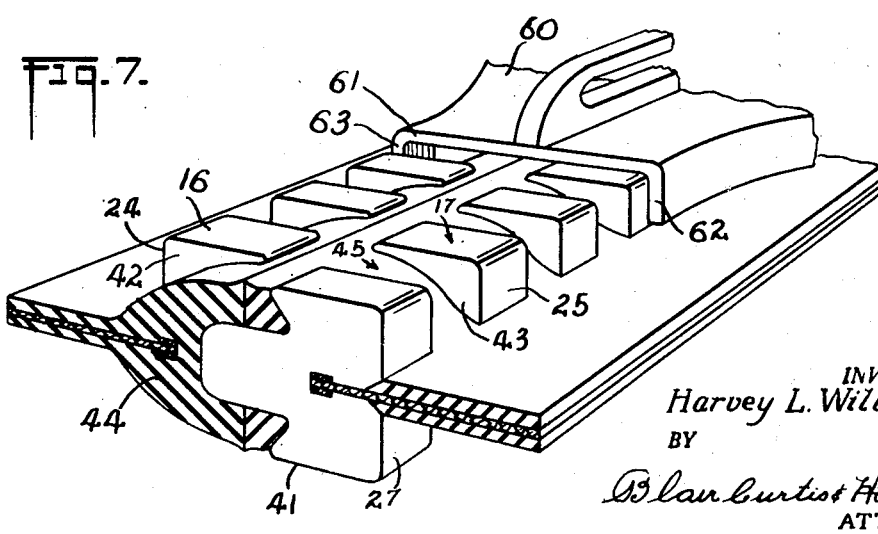
Figure 7 is an isometric view, partially shown in section, of chain similar to that of Figure 5, but provided with sealing integument and shown in interlocked, sealed relation.

This is indicated by the position of the contact between lips 48 and 49 and lips 50 and 51 in Figures 7, 8, and 12. It will be noted that surfaces 18 and 19 waterproofing components 48 and 45 respectively have taken a curved shape in Figure 12 instead of the flat shape indicated in Figure 10. It will be noted that corners 20 and 21 of waterproofing components 44 and 45 respectively have been forced upward to a plane joining surfaces 16 and 17 by the compression caused by the closing of the slide fastener as indicated in Figure 12. A similar action takes place with respect to the corresponding surfaces and corners of lips 50 and 51 on the lower side of the slide fastener.

The shape of surfaces 22 and 23 of lips 48 and 49 respectively and of the corresponding surfaces of lips 50 and 51 may be varied in several ways. The abutting surfaces for instance (such as 22 and 23) may be grooved or otherwise formed to intermesh with each other. These abutting surfaces may be vertical or they may be sloped in such fashion that corners 20 and 21 extend further across the pitch line of the slide fastener than any other portion of surface 22 or 23 respectively; or the edges may be zig-zag or moved or shifted to one side or the other of the pitch line.

Regardless of the shapes of lips 48 and 49 or 50 and 51 or their outer surfaces and corners, the objective of this construction is obtained by the extension of each abutting lip slightly beyond the sealing contact line of the slide fastener, so that upon the slide fastener being closed and the opposing teeth inter-digitated and inter-locked a positive pressure is created between both the top and bottom portions of waterproofing integuments 44 and 45, thereby creating a positive watertight or airtight seal which will be maintained so long as the teeth of the slide fastener remain interlocked.

In connection with the objective of this invention to have the water tight slide fastener operated by a conventional slider, reference is made to Figure 7 in which slider 60 is shown in the position of having closed opposing scoops 42 and 43 and several additional teeth located between these and the mouth or rear end of slider 60. It will be noted that the inner surface plane 61 of slider 60 is bearing upon the top surfaces of the teeth as illustrated by the surfaces 16 and 17 of teeth 42 and 43 respectively.

It will be noted that the right hand flange 62 of slider 60 is bearing against the outer end surfaces on the right hand chain of the slide fastener corresponding to surface 25 of tooth 43. It will be noted that the left hand flange 63 attached to the top plane of slider 60 is bearing on the outer end surfaces of the teeth attached to the left hand chain of the slide fastener such as surface 24 of tooth 42. Because of the symmetrical arrangement or construction of slider 60 and of the slide fastener chain, illustrated in the various drawings accompanying this invention, it is obvious that the bottom plane of the slider and the right and left hand flanges attached thereto will similarly engage the lower surfaces of the teeth as typified by surface of 40 of tooth 42 and surface 41 of tooth 43 and will engage the outer end surfaces on the lower sides of the tooth as indicated by surface 26 of tooth 42 and surface 27 of tooth 43.

Therefore, by this design and construction, the slider which opens and closes the slide fastener is bearing upon upper and lower and end surfaces of the teeth themselves and not upon any part of waterproofing integument 44 or waterproofing integument 45. Neither is any part of the waterproofing integument of the slide fastener so arranged that it is in contact with the external surfaces of the slider, creating friction and drag.

It is to be noted that the construction as described depends for its waterproofing and airtightness upon the fact that surfaces 22 and 23 of lips 48 and 49 and the corresponding surfaces of lips 50 and 51 are held in positive contact under compression as long as the slide fastener is closed. For this reason the drawings accompanying this invention have been prepared to indicate that with the slide fastener closed there is a slight annular space between the end surface 52 of nose 46 of tooth 42 and the surface 53 of waterproofing integument 45, located opposite surface 52. It is evident that waterproofing integument 45 could be so formed that surfaces 54, 52 and 56 on nose end 46 of tooth 42 would be in contact with surface 53 for their entire contour. It is also obvious that surface 53 of waterproof integument 45 could be so formed that surface 53 would be under compression from the action of surface 52 when the slide fastener is closed. If such compression between surface 52 and surface 53 is developed greater force will be required to close the slide fastener, placing a greater strain during all the time that the slide fastener is inter-meshed or closed upon those elements of the lower sections of the scoops, the purpose of which is to maintain the inter-meshed or inter-locked condition along the length of the slide fastener chain.

To make a slide fastener embodying waterproof components of the type described in this invention, to close easily and with minimum friction, it is desirable that surfaces 54 and 56 of nose section 46 of tooth 42 and similar surfaces of nose sections of all other teeth not be parallel, but be formed in such fashion that a taper is accomplished as indicated in Figures 10 and 12. Similarly it is desirable that surfaces 55 and 57 of waterproofing integument 45 and the equivalent surfaces of waterproofing integument 44 be not parallel, but be flared slightly so that the distance between their outer edges (nearer point 21) is greater than the distance between their inner edges (adjacent to surface 53). In this fashion surfaces 55 and 57 form a tapered recess to receive nose end 46 of tooth 42.

In Figures 13 and 14 is shown a plate type bottom stop and in Figures 15 and 17 is shown a flange type bottom stop for use on a slide fastener embodying waterproofing components as described herein.

The plate type bottom stop shown in Figures 13 and 14 consists of an upper and lower plate 70 and 71 respectively with flat outer surfaces of any suitable material. There is no reason why the outer surface of each plate should not be slightly crowned, corrugated, scored, or otherwise shaped or marked for ornamentation, strength or to secure better adhesion of the end piece described below.

Molded, cast or formed or machined on the inner surface of plate 70 and plate 71 is a block or lug 75 and 76 respectively positioned to occupy the space between scoops 72 and 74, opposite scoop 73, above and below the outer surfaces of waterproofing component 45. Similar blocks or lugs would be formed to the inner surfaces of plates 70 and 71 to occupy the spaces between scoops 77 and 73 and between scoops 73 and 78 respectively opposite scoops 72 and 74, respectively. It is evident that one lug or block positioned in the fashion of blocks 75 and 76, on each of plates 70 and 71 would probably be sufficient to prevent the plate type bottom stop from sliding longitudinal displacement of the plate type bottom stop but would also assist fastenings 89, 81 and 82 in preventing transverse displacement due to the contact which would be established between the inner surfaces of the blocks and the outer surfaces of the waterproofing integuments 44 and 45 should any transverse displacement take place. It is desirable that the plate type bottom stop be used with at least one set of internal blocks, such as 75 and 76, from each side. In such event only two fastenings, such as 80 and 82 or 81 and 82 would be used.

Edges 83 and 84 of the plate type bottom stop may be located wherever is most convenient. As indicated they bisect the surfaces of teeth 77 and 78.

It is to be noted that the compression between upper plate 70 and lower plate 71 of this bottom stop is borne by upper and lower surfaces of scoops 72, 73, 74, 78 and 77 and is not borne by any part of waterproofing integuments 44 and 45. Fastening 82 may be of many types, including rivets, screws, wire or other appropriate and suitable devices.

With reference to the flange type bottom stop shown in Figures 15 and 17, it is to be noted that the construction is similar to that for the plate type bottom stop shown in Figures 13 and 14, except that vertical flanges 92, 93, 94 and 95 have been added and that horizontal flanges 102, 104, 103 and 105 have been added. It will also be noted that the fastenings have been placed through the horizontal flanges as typified by fastenings 106 and 107.

A detailed description of this bottom stop is considered unnecessary as its principle and design are similar to those of the plate type bottom stop above described in detail with the exception of the addition of the vertical and the horizontal flanges and the location of the fastenings in the flanges rather than through the upper and lower plate.

It should be noted that the horizontal flanges 102, 103, 104 and 105 might be omitted, in which case the fastenings would be located as in the plate type bottom stop shown in Figures 13 as 80, 81 and 82.

Reference is made to Figures 15, 16 and 17 in connection with the design of end piece 110 and 111, the purpose of which is to provide a smooth rounded end for the slide fastener at its permanently closed end.

End piece 110 is a separately molded or formed piece of rubber, plastic or other suitable material the outside of which is molded or formed to a smooth contour and the inside of which is molded or formed to contour which follows the outline of the bottom stop over which it is to be laid. As illustrated in Figure 17, its inside contour has been made to correspond with the outside of the flanged type bottom stop described above. The outer edge fo 112 and of end piece 110 should be brought to a feather edge so that it may be joined with an adhesive coating to feather edges 14 and 15 on tapes 10 and 11 smoothly. Beyond the bottom end of tapes 10 and 11 edge 112 should be formed into semi-elliptical or semi-circular shape and feathered in such fashion as to form a smooth feather edge when joined with outer edge 113 of end piece 111.

It is to be noted that end pieces 110 and 111 are identical so long as the form of the bottom stop is symmetrical around the plane of the tape of the slide fastener. In event the bottom stop was not symmetrical around such plane, end pieces 110 and 111 would need to be molded separately to fit the outside contours of the upper half and lower half of the bottom stop respectively. End pieces 110 and 111 are placed in position and cemented or vulcanized partially or wholly over the bottom stop as indicated in Figure 8.

What I claim is:

1. A sealable slide fastener comprising interdigitating chains of interlocking teeth secured in spaced relation on a flexible strip, said teeth having their heel ends enlarged to greater thickness than their noses and their heel faces formed to engage a slider to be guided and cammed thereby into and out of interlocking engagement, an elastic integument extending above said teeth but below the level of the tops of said heel ends over a substantial part of the width of said flexible strip and surrounding said enlarged heel portion in fluid-tight relation and extending over a part of the nose portions of the teeth and over areas between the teeth to a line slightly beyond a sealing contact line along the chain of teeth, whereby when the chains are interlocked said integuments are compressed together along said sealing contact line.

2. A slide fastener as defined in claim 1 in which the heel surface of each tooth adjacent its point of engagement with the strip is undercut, better to key the integument thereto.

3. A slide fastener as defined in claim 1 in which a portion of the tooth is grooved and the integument engages in the groove, better to key the integument thereto.

4. A sealable fastener as defined in claim 1 in which the integument is thickened in the spaces between the teeth, whereby the meeting edges of the integument are held in a common plane and against sagging between the teeth.

5. A sealable fastener as defined in claim 1 in which an integument as defined is used on each side of the chain, whereby pressure from either direction will tend to close the abutting integuments on one side together against the support of the underlying teeth.

6. A sealable slide fastener which comprises flexible interdigitating chains of interlocking teeth each tooth comprising a heel portion upstanding from the integument hereinafter specified and an interlocking nose portion projecting therefrom, said upstanding portion being grooved on upstanding faces thereof and an elastic integrument engaging said teeth in said grooves in fluid-tight relation and extending therebeyond across the spaces between the teeth and over the interlocking noses of the teeth and the intervening spaces to a line slightly beyond the pitch line of the teeth, and to the opposite side of the teeth being sealed to an adjacent fabric to which the chain is attached.

7. A slide fastener comprising flexible interdigitating chains of interlocking teeth secured to a flexible tensile member of substantially fixed length in each chain, each tooth comprising a heel portion upstanding abruptly on opposite sides from an interlocking nose portion to form cam faces positioned so that the tensile member lies within approximately the same portion of the tooth as said upstanding cam faces, and a slider having spaced planes connected by a frog and having converging channels adapted to receive said heel portion of the teeth and engage opposite upstanding faces thereof to guide them both in and out of interlocking relation, said channels being spaced from said frog a distance greater than the length of said nose portion of the teeth, whereby said nose portions are prevented from dragging on said frog.

8. A sealable slide fastener comprising complementary chains of interdigitating elements with interlocking noses and elastic trasversely compressible sealing elements lying substantially entirely between the levels of the tops and bottoms of said interdigitating elements secured to said chains behind said noses and pressed into sealing relation when the fastener is closed, and a slider both planes of which move outside of the sealing elements and are provided with converging flanges which guide the fastener elements into interdigitating relation.

HARVEY L. WILLIAMS.

REFERENCES CITED

The following references are of record in the file of this patent:

UNITED STATES PATENTS

| Number | Name | Date |
| --- | --- | --- |
| 1,895,172 | Prentice | Jan. 24, 1933 |
| 2,097,099 | Legat | Oct. 26, 1937 |
| 2,124,206 | Mulka | July 19, 1938 |
| 2,296,468 | Feist | Sept. 22, 1942 |
| 2,306,873 | Feist | Dec. 29, 1942 |
| 2,385,816 | Krupp | Oct. 2, 1945 |

FOREIGN PATENTS

| Number | Country | Date |
| --- | --- | --- |
| 214,594 | Switzerland | 1941 |